July 25, 1944.　　　G. G. McNAMARA, JR　　　2,354,268
HITCH
Filed Aug. 31, 1942
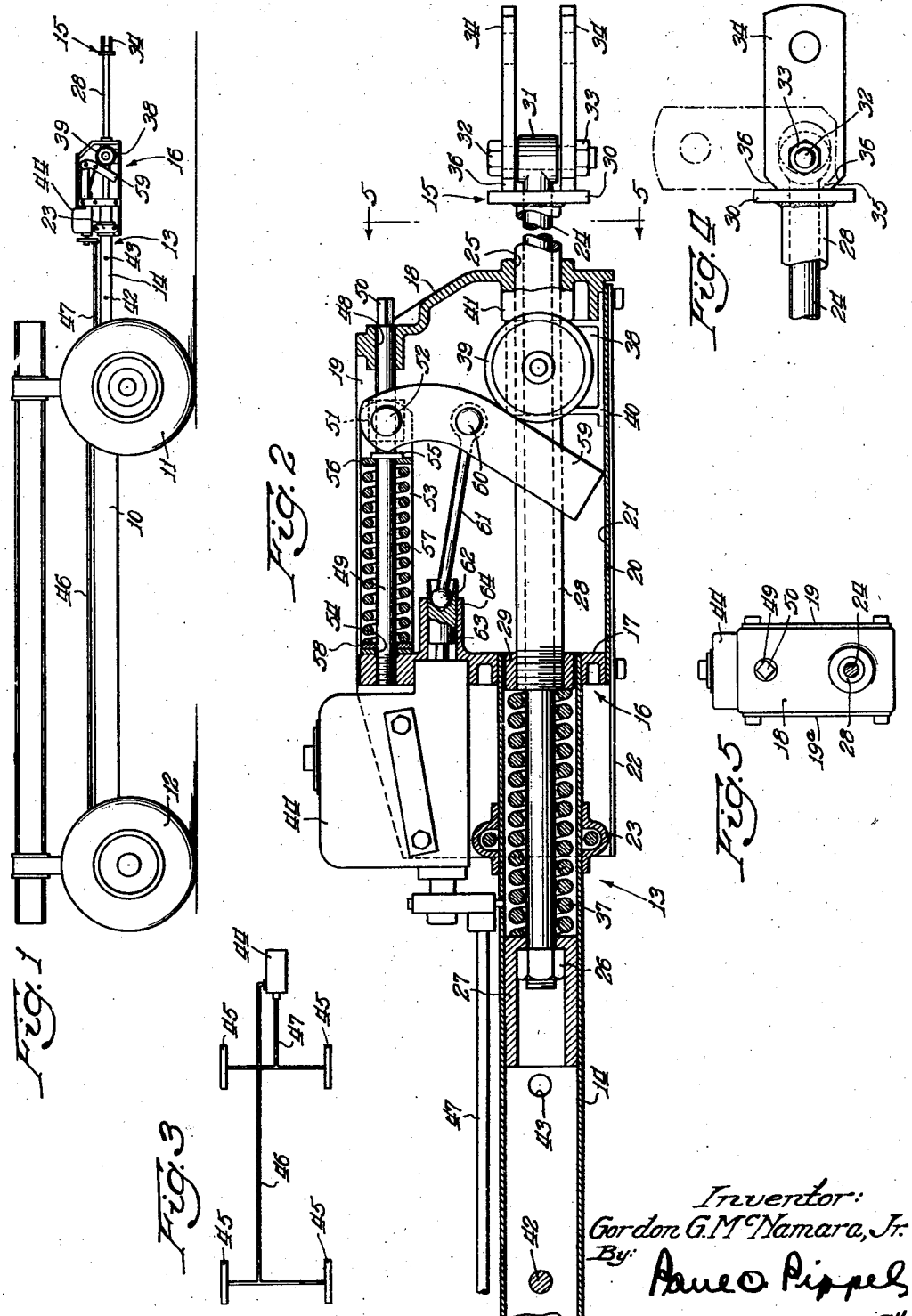
Inventor:
Gordon G. McNamara, Jr.
By Patented July 25, 1944

2,354,268

UNITED STATES PATENT OFFICE 2,354,268

HITCH

Gordon G. McNamara, Jr., Chicago, Ill., assignor to International Harvester Company, a corporation of New Jersey Application August 31, 1942, Serial No. 456,773

19 Claims. (Cl. 188—142)

This invention relates to a hitch and more particularly to a hitch of the type including therein means for actuating the braking mechanism of a trailing vehicle, the hitch forming a connection between the trailing vehicle and a towing vehicle.

In general, the principal problems encountered in the construction of a hitch of the type referred to center about a design that permits relative movement of the towing vehicle and trailer toward each other as the speed of the trailer increases beyond that of the towing vehicle. This relative movement is permitted between a pair of hitch parts respectively connected to the towing vehicle and the trailer, and such movement is ordinarily utilized to effect the operation of the brake mechanism of the trailer for the purpose of slowing down the trailer to prevent forward surge thereof. Heretofore no little difficulty has been experienced in providing adequate brake-actuating mechanism, principally because of the various factors to be considered, such as the desirable amount of relative movement to be permitted between the hitch parts, the factors of leverage between the forces applied by the hitch part and the forces applied to the trailer brakes, and various incidental factors relating generally to the association between the hitch parts.

The principal object of the present invention is to provide an improved hitch of the type referred to.

Another important object is to provide such a hitch with improved brake-actuating mechanism.

Another important object is to provide brake-actuating mechanism capable of exerting substantial forces in relation to comparatively little relative movement between the hitch parts.

Another object is to include in the brake-actuating mechanism means including a toggle capable of rapidly increasing the ratio between the force applied to the actuating mechanism and the force applied by said mechanism to the trailer brakes.

Another object is to provide a hitch having a pair of hitch parts relatively movable in opposite directions along the line of draft and to provide improved resilient or cushion means for taking up shocks between these parts.

Still another object lies in the provision of an improved hitch part construction providing releasable means guarding against the breakage of the hitch by forces applied thereto transversely of the line of draft.

Briefly and specifically, these and other objects and features are achieved in one preferred form of the invention by the provision of a hitch comprising a pair of relatively movable hitch parts connected together for cushioned relative movement in at least two opposite directions along the line of draft between a trailer and a towing vehicle. One of the hitch parts carries a roller slidable therewith and engageable with a swingable arm included as part of a leverage-increasing or toggle mechanism carried by the other hitch part, this mechanism being appropriately associated with means for actuating the trailer brakes. The forward end of one of the hitch parts is provided with a supplemental portion pivoted thereto on a vertical axis, this means being normally held in position against pivoting but releasable to pivot with respect to said hitch part upon an excess of force applied to the hitch in a direction transversely of the line of draft.

A further and more complete understanding of the invention may be had from the following detailed description of a preferred embodiment of the invention as illustrated in the accompanying sheet of drawings, in which:

Figure 1 is a side elevational view of a trailer having a hitch embodying one form of the invention;

Figure 2 is an enlarged view, partly in section, showing the details of the hitch construction and of the brake-actuating mechanism;

Figure 3 is a schematic view illustrating one form of fluid braking system for the trailer;

Figure 4 is a view of the forward portion of the hitch showing the construction thereof with respect to the safety means for preventing accidental damage to the hitch by forces applied thereto in a direction transversely of the line of draft; and Figure 5 is a transverse sectional view on a reduced scale taken on the line 5—5 of Figure 2.

The trailer chosen for the purposes of illustration is of a type well known commercially and includes a longitudinal body 10 carried on steerable front wheels 11 and rear wheels 12. The hitch is indicated generally at 13 and extends forwardly of the trailer and is adapted to be connected to the rear of a towing vehicle.

As best shown in Figure 2, the hitch 13 comprises a rear hitch part or member 14 and a front hitch part or member 15.

The rear hitch part is preferably tubular in cross-section and carries at the forward end thereof a housing structure 16. This housing comprises a plurality of parts associated together to provide an enclosure for the working parts of the hitch structure and the brake-actuating mechanism, as will presently appear.

The housing 16 includes a rearward wall portion 17 rigidly carried by the front end of the rear hitch part 14. A second generally vertical wall 18 is spaced forwardly from the wall 17, and these walls are rigidly interconnected by a longitudinally extending, vertically disposed side wall 19. Another side wall 19a may be arranged over and between the walls 17 and 18, for the purpose of completing the enclosure provided by the housing, as shown in Figure 5. The walls 17 and 18 are further connected at their bottoms by a longitudinally extending plate 20 having an upper inner bearing surface 21, the function of which will be described later. A second plate 22 underlies the plate 20 and extends between the wall 18 and an intermediate portion of the rear hitch part 14, at which point the housing structure includes clamp means 23 providing additional means for securing the housing 16 to the rear hitch part 14.

The front hitch part 15 includes a main hitch member 24 comprising a rod extending longitudinally through an opening 25 in the front wall 18 of the housing and further extending within the tubular forward portion of the hitch part 14. The rearward end of the rod 24 is threaded and provided with a nut 26 that fits inside a socket member 27 which is in turn slidably carried in the tubular hitch part 14.

An intermediate member in the form of a sleeve 28 encircles the rod 24 and is carried slidably by the front wall 18 of the housing 16 in the opening 25 thereof. The rear portion of the sleeve extends just within the forward end of the tubular hitch part 14 and is threaded and provided with a nut 29. The extreme forward end of the sleeve 28 has rigidly secured thereto as by welding a transverse plate 30. The plate is apertured and the rod or hitch member 24 extends therethrough and is provided with an eye portion apertured on a vertical axis to receive a connecting means in the form of a vertical pin 32 threaded at one end and carrying a nut 33. The pin or bolt 32 serves to connect to the eye 31 of the rod 24 a pair of vertically spaced clevis plates 34, both of which are apertured vertically to provide means for connecting the hitch 13 to a towing vehicle.

As best shown in Figure 4, the rear ends of the clevis plates 34 abut the transverse plate 30 on the sleeve 28 in such a manner that the connection between the plates 34, the rod 24, and the sleeve 28 is normally rigid. For this purpose the rear end of each clevis plate is provided with a transverse rear portion 35 that normally abuts the front walls of the transverse plate 30. The portion 35 terminates at its opposite ends in cutaway corner portions 36, each of which is arranged at an angle to the transverse portion 35. The arrangement of and cooperation between the portions 35 and 36 and the transverse plate 30 provide, in conjunction with a resilient means to be presently described, release means adapting the clevis plates 34 to pivot about the pin or bolt 32 with respect to the hitch part 24 upon excessive forces applied to the hitch in a direction transversely of the line of draft between the towing and trailing vehicles.

Cushion or resilient means in the form of a coil spring 37 is arranged between the socket member 27 on the rod 24 and the nut 29 on the sleeve 28. This spring is enclosed within the forward tubular portion of the rear hitch part 14. The spring 37 is under compression and acts between the members 27 and 29 to maintain the hitch plates 34 normally against the transverse plate 30 so that the transverse portion 35 of each plate 34 engages the front wall of the plate 30, thus maintaining the plates 34 in longitudinal alinement with the rod 24. Since the rod 24 is slidable longitudinally with respect to the sleeve 28, it will be seen that the plates 34 may pivot sidewise or transversely with respect to the rod 24 about the vertical axis of the pivot pin or bolt 32. This result is best indicated in broken lines in Figure 4. The provision of this feature in the invention is important, since it guards against accidental breakage of the hitch by the application of excessive force to the hitch in a direction transversely of the line of draft. Such force may result, for example, from an extremely short turn of the towing vehicle at which time the hitch and towing vehicle become "cramped."

The forward end of the sleeve 28 at the portion thereof within the housing 16 carries a block 38 upon which is mounted on a transverse axis a roller 39. The block is pinned or otherwise secured to the sleeve 28 but is not secured to the rod 24. The lower portion of the block is provided with a bearing 40 which is slidable upon the upper inner bearing surface 21 provided on the plate 20, as previously referred to. In addition to its function as part of the brake-actuating means to be presently described, the block 38 serves the function of a stop means as a component part of the cushioning means between the hitch parts 24 and 14. As will be noted from an examination of Figure 2, the block 38 in its forwardmost position abuts a boss 41 formed as an integral part of the inner portion of the front wall 18 of the housing 16.

From the description thus far, it will be seen that towing forces exerted by the towing vehicle are taken by the cushioning means or spring 37 through the medium of the cooperation between the spring and the hitch parts 40, 24, and 28 and the stop means provided by the parts 27, 29, and 41. Exertion of a force tending to move the rod 24 forwardly with respect to the hitch part 14 results in compression of the spring 37 against the nut 29 on the sleeve 28. Since the sleeve carries the sliding block 38, which in turn abuts the boss 41 on the wall 18, there will be relative separation in a forward direction between the rod 24 and the sleeve 28, this relative movement or separation being cushioned by the action of the spring 37. When the towing vehicle is backed, the rod 24 and sleeve 28 will move rearwardly as a unit into the hitch part 14, because of the abutment between the clevis plates 34 and the transverse plate 30 on he front of the sleeve 28. This relative movement rearwardly between the hitch parts 14 and 24 is normally unopposed, since the members 27 and 29 are freely slidable in the tubular hitch part 14. This free movement is limited only by a stop in the form of a transverse pin 42 carried by the hitch part 14 at a point longitudinally spaced rearwardly of the normal position of the member 27. Since in certain circumstances this free movement may be undesirable, there has been provided in the hitch part 14 an aperture 43 on a transverse axis disposed almost immediately rearwardly of the rear portion of the member 27. Any convenient bar or pin may be inserted through the aperture 43 to provide an additional stop or lock means for cooperation with the member 27. In such instance, the member 27 becomes rigid with respect to the hitch part 14 and relative movement between the hitch parts 14 and 24 in a direction to collapse those parts will be cushioned by the action of the spring 37 between the member 27 and the nut 29, it being appreciated that the rear end of the hitch part 24 passes freely or slidably through and within the member 27.

The improved hitch construction just described is further provided as an additional feature of the invention with means for operating braking mechanism on the trailer. To this end the housing 16 includes as a part thereof or provides a support for brake-operating mechanism having a master fluid or hydraulic cylinder indicated generally at 44. This cylinder may be of any conventional construction and therefore has not been illustrated in greater detail. This cylinder forms a part of a fluid or hydraulic braking system for the trailer, this system including, as best shown in Figure 3, brake drums 45 on the trailer wheels 11 and 12 suitably connected by fluid lines 46 and 47 between the rear and front wheels respectively and the master cylinder 44.

The housing 16 is provided at its upper portion with a part of the improved brake-actuating mechanism. The front wall 18 of the housing is provided with a bore 48 on a longitudinal axis paralleling the axis of the telescopic hitch parts. The rear wall 17 is provided at its upper portion with a coaxially threaded bore into which is threaded the rear end of a longitudinally extending rod 49. The front end of the rod is provided with a portion 50 adapted to receive a key or wrench for the purpose of providing means for the installation, removal, or adjusting of the rod in the housing 16. The rod 49 slidably carries at a forward portion thereof a pivot block 51. This block has a pair of oppositely extending transverse trunnions 52 that pass through the opposite forward ends of a U-shaped strap member 53. The rearward or bight portion of the member 53 is adjacent the upper portion of the wall 17 and is apertured as at 54 so that the rod 49 may pass freely therethrough. The rod 49 is provided just rearwardly of the slidable block 51 with a stop portion 55 rigidly thereon. A washer 56 encircles the rod 49 and abuts the stop 55. A compression coil spring 57 provides resilient means acting between the washer 56 and a second washer 58 that abuts the bight portion of the member 53. The action of the spring is such as to urge rearwardly the assembly consisting of the member 53 and slidable block 51. In other words, the member 53 and block 51 may move toward the front wall 18 of the housing 16 against the compression of the spring 57 as abutting the stop 55 on the rod 49.

The trunnion members 52 on the slidable block 51 serve to carry swingably thereon a depending arm 59, the lower portion of which is arranged in the path of rearward movement of the roller 39 on the sleeve 38 of the hitch 13. An intermediate portion of the arm 59 is connected by a pin 60 to a rod 61 having its other end provided with a ball 62 carried in the socket of a longitudinally slidable member 63. This member is slidably carried in a sleeve portion 64 of the rear wall 17 of the housing 16 and is reciprocable to operate the piston, not shown, of the master brake cylinder 44.

It will be seen from the description thus far that relative movement between the hitch parts in a direction tending to collapse or telescope those parts results in movement of the roller 39 rearwardly. The roller then engages the arm 59 and swings the same about the pivot provided by the trunnions 52 on the block 51. The connecting rod 61 is moved rearwardly to operate the piston in the master cylinder 44 for the purpose of forcing brake fluid through the lines 46 and 47 to the braking mechanism including the drums 45 on the trailer wheels 11 and 12.

An important feature of the invention is the construction and arrangement of the brake-actuating means comprising the roller 39 and the arm 59 and the resilient supporting of the arm 59 in the housing 16. The arm 59 is so shaped as to provide a cam portion cooperable with the roller 39 to provide for an increase in the ratio between the force resulting from relative movement of the hitch part and the force applied against the plunger 63 and consequently against the piston in the master cylinder 44. This arrangement results in an original application of forces at a ratio of substantially 1:1, this ratio increasing comparatively rapidly to an ultimate ratio of 16:1, for example. Consequently, initial relative movement between the hitch parts as the trailer surges forwardly with respect to the towing vehicle will not result in a sudden application of the brakes of the trailer but rather will operate to take up "slack" in the actuating mechanism and in the fluid lines. However, increased surging of the trailer rapidly increases the ratio as respects the force to be applied to the plunger 63, with the result that the brakes are first gently and then more strongly applied. It will be noted further that the relative movement between the hitch parts as the roller moves rearwardly is relatively slight. This is an important feature inasmuch as it eliminates unnecessarily long hitch parts heretofore required to accommodate the necessary application of forces between the hitch parts and the brake-actuating mechanism.

The operation of the improved hitch construction and its associated brake-actuating mechanism should be apparent from the foregoing description of the structure thereof. The several important features of the invention should be noted. For example, it will be seen that the principles of the invention as embodied in the preferred form illustrated and described provide brake-actuating mechanism having a powerful mechanical leverage without excessive relative movement or telescoping of the hitch parts. This leverage is obtained by the toggle consisting of the arm 59 and connecting rod 61 and the function of the roller in being forced under the arm in a wedge action. It is particularly important to note that the downward reaction of the arm 59 against the roller 39 is not taken on the sleeve 28 but is taken on the bearing surfaces 40 and 21 of the block 38 and lower steel plate 20 respectively of the housing 16. Since the housing is substantially enclosed, it can be supplied with a quantity of lubricant and the working parts of the structure can thus be adequately lubricated.

Another important feature is that the connecting rod 61 exerts no side thrust on the piston of the master cylinder 44, this thrust being taken wholly by the plunger 63 which slides in the integral sleeve 64 of the rear wall 17 of the housing 16.

The spring 57 on the support or rod 49 at the upper portion of the housing 16 serves to eliminate shocks on the pivot point or trunnions 52, the relief or resiliency provided for by the spring being very similar to the flexibility of one's ankle as pressure is applied to an ordinary brake pedal.

The heavy coil spring 37 serves at least three important functions, viz., it maintains a tension between the clevis plates 34 and the transverse plate 30, as previously described; it cushions the shock when the trailer is started forward or backward; it provides a cushioned stop upon telescoping of the hitch parts to prevent excessive movement of the plunger 63 and consequent excessive movement of the piston in the master cylinder 44, and thus eliminates the possibility of damage to these comparatively delicate parts. Another feature of the invention is the association between the transverse pin 42 and the member 27 and the transverse aperture 43 through which may be inserted any convenient rod or bar for the accomplishment of the purposes heretofore described.

Undoubtedly other important features of the invention will become apparent to those skilled in the art. It will be understood, of course, that the foregoing description and illustrations are of a preferred embodiment of the invention and that numerous modifications and alterations may be made therein without departing from the spirit and scope of the invention as defined in the appended claims.

What is claimed is:

1. A hitch comprising a first member adapted to be connected to a source of draft power, a second member adapted to be connected to an object to be drawn, resilient means connected between said members for relative movement of the members along the line of draft, means connecting said members for relative movement transversely of the line of draft, and releasable means normally holding said members against the second named movement and releasable upon relative movement of said members along the line of draft.

2. A hitch comprising a first member adapted to be connected to a source of draft power, a second member adapted to be connected to an object to be drawn, means connecting said members for relative movement transversely of the line of draft, releasable means normally holding the members against said movement, and means responsive to an excess of force applied against at least one of the members transversely of the line of force to release the releasable means for permitting the aforesaid relative movement.

3. A hitch comprising a first member adapted to be connected to a source of draft power, a second member adapted to be connected to an object to be drawn, resilient means connected between said members for relative separation of the members along the line of draft, means connecting said members for relative movement transversely of the line of draft, and lock means including interengaging portions on the members normally holding said members against the second named movement, said portions being normally held in engagement by the aforesaid resilient means.

4. A hitch comprising a first member, a second member, resilient means connected between said members for relative movement of said members, a third member, means connecting the second and third members for relative movement, and lock means normally engaged between the first and third members for preventing said relative movement between the second and third members, said lock means being releasable upon relative movement between the first and second members.

5. A hitch comprising a first member, a second member, resilient means connected between said members for relative movement of said members along the line of draft, a third member, means connecting the second and third members for relative movement transversely of the line of draft, and lock means normally engaged between the first and third members for preventing said relative transverse movement between the second and third members, said lock means being releasable upon relative movement along the line of draft between the first and second members.

6. A hitch comprising a first member, a second member arranged for relative sliding movement along the line of draft, a third member pivoted to the second member and including a portion normally engaging the first member to prevent relative pivoting between the second and third members, and resilient means between the first and second members for permitting yielding relative sliding movement between the first and second members to release the third member for pivoting on the second member.

7. A hitch comprising a first member, a second member arranged for relative sliding movement along the line of draft, a third member pivoted to the second member, lock means between the third and first members to prevent relative pivoting between the second and third members, whereby relative sliding movement between the first and second members permit the relative pivoting between the second and third members.

8. A brake-hitch comprising a first member, a second member, means mounting said members for relative movement along the line of draft, a support, means mounting the support on the first member for movement with respect to said first member along the line of draft, yielding means maintaining a predetermined position of the support with respect to the first member, an arm pivoted to the support on an axis transverse to the line of draft for swinging movement of the arm along the line of draft, means on the second member including a roller engageable with the swingable arm whereby relative movement of said members along the line of draft will effect swinging of the arm, and means adapting said arm for connection to brake-operating mechanism.

9. A brake-hitch for connection between a first vehicle and a second vehicle having brakes, comprising a first hitch part adapted for connection to one vehicle, an intermediate member carried by said hitch part for movement in two directions with respect to the hitch part, means limiting relative movement of said member in one direction, a second hitch part adapted for connection to the second vehicle, means slidably carrying said second hitch part on the intermediate member for cushoned movement in one direction with respect to said member, means connecting said member and the second hitch part for movement together in another direction with respect to the first hitch part, brake-operating means for the trailer brakes including an element movably carried by the first hitch part, and an actuating member carried by the intermediate member and engageable with said element upon rearward movement of the first hitch part and intermediate member with respect to the first hitch part.

10. A brake-hitch comprising a first member, a second member, means mounting said members for relative movement along the line of draft, a support carried by the first member, an arm slidably pivoted to the support on an axis transverse to the line of draft for swinging movement along the line of draft, said arm including a cam portion, means on the second member including a roller engageable with the cam portion of the swingable arm whereby relative movement of said members along the line of draft will effect swinging of the arm, and means adapting said arm for connection to brake-operating mechanism.

11. A brake-hitch comprising a pair of members relatively movable along the line of draft, a rod carried by one member and extending along the line of draft, a pivot member slidable along the rod, yielding means maintaining a normal position of said pivot member, an arm swingable on the pivot member generally along the line of draft, means on the other of the aforesaid members engageable with the arm upon relative movement of said members, and means adapting the arm for connection to brake mechanism.

12. A brake-hitch comprising a pair of members relatively movable along the line of draft, a rod carried by one member and extending along the line of draft, a pivot member slidable along the rod, tensioning means maintaining a normal position of said pivot member, means for adjusting said tensioning means, an arm swingable on the pivot member generally along the line of draft, means on the other of the aforesaid members engageable with the arm upon relative movement of said members, and means adapting the arm for connection to brake mechanism.

13. A brake-hitch comprising a pair of members relatively movable along the line of draft, a rod carried by one member and extending along the line of draft, a brake-actuating member slidable along the rod, yielding means maintaining a normal position of said member, means on the other of the aforesaid members engageable with the brake-actuating member upon relative movement of said members, and means adapting the brake-actuating means for connection to brake mechanism.

14. A brake-hitch comprising a first hitch part, a second hitch part, means connecting said parts for relative movement along the line of draft, a support carried by the first hitch part, a member connected to the second hitch part for movement therewith and slidably bearing on the aforesaid support, and a brake-actuating member carried by the first hitch part and engageable by the aforesaid member upon relative movement between said hitch parts.

15. A brake-hitch comprising a first hitch part, a second hitch part, means connecting said parts for relative movement along the line of draft, a support carried by the first hitch part, a member connected to the second hitch part for movement therewith and slidably bearing on the aforesaid support, and brake-actuating means including toggle mechanism carried by the first hitch part and operable by the aforesaid member upon relative movement of said hitch parts.

16. A brake-hitch comprising a first hitch part, a second hitch part, means connecting said parts for relative movement along the line of draft, a member connected to the second hitch part for movement therewith, and brake-actuating means carried by the first hitch part and operable by the aforesaid member upon relative movement of said hitch parts, said brake-actuating means including toggle mechanism arranged to increase rapidly the ratio between forces applied by the brake-actuating means and the amount of relative movement of said hitch parts.

17. A hitch comprising a pair of hitch parts, means connecting said parts for relative movement in opposite directions along the line of draft, cushion means connected to one part, means connected to the other part and engageable with the cushion means to cushion relative movement of said parts in one direction, means connected to said second named part and arranged with respect to the cushion means to permit limited uncushioned relative movement of said parts in the opposite direction, and means connectable optionally between said second named part and the cushion means to provide for immediate cushioning of the relative movement of said parts in said opposite direction.

18. A brake hitch comprising one member attached to a pulling vehicle, a second member attached to a trailing vehicle, means permitting limited relative movement of the two members, a lever arm operatively connected to one of said members and shiftable upon relative movement of said members, said lever arm having two shiftable fulcrums, brake operating means for said trailing vehicle engaging said lever arm at one of said shiftable fulcrums, and resilient means yieldably fixing the other of said shiftable fulcrums, whereby the brake operating means will be actuated until a force is attained sufficient to overcome the resilient means and to shift the other fulcrum.

19. A brake hitch comprising one member attached to a pulling vehicle, a second member attached to a trailing vehicle having brakes, means permitting limited relative movement of the two members upon overrunning of the trailing vehicles, a brake actuating means, said means including a lever operably connected to one of said members and shiftable upon relative movement of said members, brake applying means engageable by said lever and operable upon shifting of the lever, and means associated with said brake actuating means yieldable after a predetermined force has been exerted thereon, said yieldable means permitting further over-running of the trailing vehicle and subsequent shifting of the lever without applying excessive force on the brake applying means.

GORDON G. McNAMARA, Jr.